(12) United States Patent
Ge et al.

(10) Patent No.: US 11,402,332 B2
(45) Date of Patent: Aug. 2, 2022

(54) SURFACE ENHANCED LUMINESCENCE SENSOR NANO FINGER

(71) Applicant: HEWLETT-PACKARD DEVELOPMENT COMPANY, L.P., Houston, TX (US)

(72) Inventors: Ning Ge, Palo Alto, CA (US); Viktor Shkolnikov, Palo Alto, CA (US); Anita Rogacs, Palo Alto, CA (US); Steven J. Simske, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 795 days.

(21) Appl. No.: 16/076,083

(22) PCT Filed: Jan. 31, 2017

(86) PCT No.: PCT/US2017/015799
§ 371 (c)(1),
(2) Date: Aug. 7, 2018

(87) PCT Pub. No.: WO2018/143930
PCT Pub. Date: Aug. 9, 2018

(65) Prior Publication Data
US 2021/0215612 A1    Jul. 15, 2021

(51) Int. Cl.
*G01N 21/65* (2006.01)
*G01N 21/552* (2014.01)
*B82Y 15/00* (2011.01)

(52) U.S. Cl.
CPC ......... *G01N 21/658* (2013.01); *G01N 21/554* (2013.01); *B82Y 15/00* (2013.01)

(58) Field of Classification Search
CPC ..... G01N 21/658; G01N 21/554; B82Y 15/00
See application file for complete search history.

(56) References Cited

U.S. PATENT DOCUMENTS

| | | |
|---|---|---|
| 7,303,815 B2 | 12/2007 | Yang et al. |
| 7,940,387 B2 | 5/2011 | Dluhy et al. |
| 8,520,202 B2 | 8/2013 | Li |
| 9,097,616 B2 | 8/2015 | Wang et al. |
| 9,702,821 B2 | 7/2017 | Zhou et al. |
| 2005/0191665 A1 | 9/2005 | Su et al. |
| 2011/0116089 A1* | 5/2011 | Schmidt ............... G01N 21/658 356/244 |

(Continued)

FOREIGN PATENT DOCUMENTS

| | | |
|---|---|---|
| WO | 201 1133143 A1 | 10/2011 |
| WO | 2016046645 A1 | 3/2016 |

OTHER PUBLICATIONS

Zhang et al., "Asymmetric AgPd-AuNR Heterostructure With Enhanced Photothermal Performance and SERS Activity", Nanoscale, Royal Society of Chemistry, 2012, 7 Pages.

*Primary Examiner* — Dominic J Bologna
(74) *Attorney, Agent, or Firm* — Nwamu PC

(57) ABSTRACT

A surface enhanced luminescence (SEL) sensor may include a substrate and nano fingers extending from the substrate. In one implementation, the nano fingers may be arranged in a cluster of at least three nano fingers extending from the substrate. The nano fingers of the cluster having different geometries so as to bend into a closed state such that each of the nano fingers of the cluster are linked to one another.

19 Claims, 3 Drawing Sheets

(56) References Cited

U.S. PATENT DOCUMENTS

| | | | | |
|---|---|---|---|---|
| 2013/0040862 A1* | 2/2013 | Li | ........................ | G01N 21/658 |
| | | | | 977/762 |
| 2013/0070241 A1* | 3/2013 | Li | ........................ | G01N 21/658 |
| | | | | 356/301 |
| 2014/0024131 A1* | 1/2014 | Kim | ........................ | G01N 21/00 |
| | | | | 436/172 |
| 2014/0029002 A1* | 1/2014 | Wang | ..................... | G01N 21/658 |
| | | | | 356/301 |
| 2014/0125976 A1* | 5/2014 | Kim | ..................... | G01N 21/658 |
| | | | | 356/301 |
| 2014/0198314 A1* | 7/2014 | Li | ........................ | G01N 21/658 |
| | | | | 356/301 |
| 2015/0036132 A1* | 2/2015 | Bond | ..................... | C23C 16/045 |
| | | | | 356/244 |
| 2015/0355093 A1 | 12/2015 | Zhou et al. | | |
| 2015/0374268 A1* | 12/2015 | Yamakawa | .......... | G01N 21/658 |
| | | | | 435/29 |

* cited by examiner

SURFACE ENHANCED LUMINESCENCE SENSOR NANO FINGER

BACKGROUND

Surface enhanced luminescence (SEL) is sometimes used for analyzing the structure of an analyte such as inorganic materials and complex organic molecules. SEL sometimes utilizes nano fingers to enhance sensing of analyte. SEL focuses electromagnetic radiation or light onto the analyte, wherein the interaction between the light and the analyte is detected for analysis.

Figure 1:
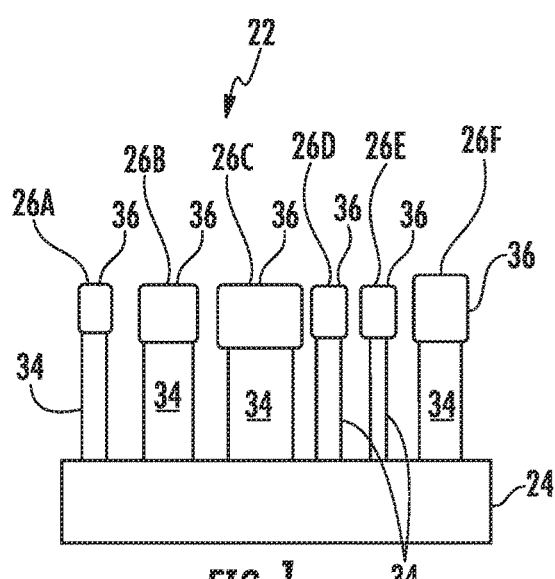
FIG. 1 is a side view of an example SEL sensor stage.

Throughout the drawings, identical reference numbers designate similar, but not necessarily identical, elements. The figures are not necessarily to scale, and the size of some parts may be exaggerated to more clearly illustrate the example shown. Moreover the drawings provide examples and/or implementations consistent with the description: however, the description is not limited to the examples and/or implementations provided in the drawings.

DETAILED DESCRIPTION OF EXAMPLES

Surface enhanced luminescence (SEL), such as surface enhanced Ramen spectroscopy (SERS), may use a nano structure, for example, polymer nano fingers with a metal particle tip to enhance sensitivity. The nano fingers may be closed towards one another to capture analyte between tips of the nano fingers and to form "hot spots". Evaporation of the liquid containing the analyte is sometimes used to close the nano fingers towards one another using capillary forces. A closed state is a state where the metal tops of the nano fingers form gaps there between, on the order of nanometers, to provide an enhanced electric field and signal response.

Disclosed herein are example SEL sensors or SEL sensor stages and example methods that enhance directional control over the closure of the nano fingers towards one another. As will be described hereafter, the example SEL sensors, SEL sensor stages and methods utilize nano fingers that as a group have heterogeneous geometries or individually have asymmetric geometries such that the nano fingers have a greater tendency to collapse or bend in a first selected direction as compared to other directions in response to an applied stimulus. In other words, the heterogeneous or asymmetric geometries of the nano fingers facilitate enhanced control over the direction in which the nano fingers bend in response to a stimulus. As a result, the closure of nano fingers for SEL sensing may be more reliably predicted and controlled for enhanced performance.

Disclosed herein is an example surface enhanced luminescence (SEL) sensor stage for a SEL sensor that facilitates enhanced directional control over the collapse of nano fingers during application of a stimulus. The SEL sensor may include a substrate and nano fingers extending from the substrate. In one implementation, the nano fingers may be arranged in a cluster of at least three nano fingers extending from the substrate. The nano fingers of the cluster having different geometries so as to bend into a closed state such that each of the nano fingers of the cluster are linked to one another.

Disclosed herein is another example SEL sensor stage for a SEL sensor that facilitates enhanced directional control over the collapse of nano fingers during application of a stimulus. The SEL sensor may comprise a substrate and a nano finger having a base extending from the substrate. The nano finger may have a center of mass offset from a center of the base.

Disclosed herein is another example SEL sensor stage for a SEL sensor that facilitates enhanced directional control over the collapse of nano fingers during application of a stimulus. The SEL sensor stage may comprise a substrate and a cluster of nano fingers centered about a center point. Each of the nano fingers of the cluster have non-circular cross-sectional shapes so as to bend towards the center point in response to a stimulus.

FIG. 1 illustrates a portion of an example SEL sensor platform or stage 22 for use in a SEL sensor. Stage 22 serves as a surface for supporting an analyte and for enhancing interactions between impinging light and the analyte for enhanced sensor sensitivity. Stage 22 enhances directional control over the closure of the nano fingers towards one another.

Stage 22 comprises substrate 24 and nano fingers 26A, 26B, 26C and 26D (collectively referred to as nano fingers 26), amongst others. Substrate 24 comprises a base or foundation for supporting nano fingers 26. In one implementation, substrate 24 comprises a layer of silicon, courts, glass or a polymeric film such as polyethylene trap the late (PET). In some implementations, substrate 24 may additionally comprise and interlayer the dielectric material between the silicon substrate and nano fingers 26. Such an interlayer dielectric may form from a material such as SiO2 TEOS, a passivation layer of SiC, silicon nitride, etc. In other implementations, other interlayer dielectric materials may be utilized. In still other implementations, substrate 24 may be formed from other materials such as quartz, ceramics, polymers and other materials.

Nano fingers 26 comprise elongated flexible columnar supports such as needles, fingers, particles or wires. In one implementation, such nano fingers 26 have an aspect ratio of and at least 10:1 (a height of at least 10 times the thickness or diameter). In one implementation, such nano fingers 26 have a thickness or diameter between 50 nm and 100 nm, while, at the same time, having a height of at least 500 nm and, in one implementation, at least 700 nm. In some implementations, the nano fingers 26 are movable and are self-actuating, wherein such columnar structures bend or flex towards one another in response to micro-capillary forces or van der Waals forces so as to self-organize, wherein such bending facilitates close spacing between the structures for greater scattered radiation intensity.

Each of the nano fingers may comprise a pillar 34 supporting a highly conductive or plasmonically active tip or cap 36. In one implementation, each pillar 34 comprises an elongate column formed from a polymer material. The polymer material facilitates the use of molding, imprinting or other fabrication techniques to form pillars 34. The polymer material further facilitates bending and flexing of pillars 34 and subsequently closing during use of sensor 20. Examples of polymer materials from which each pillar 34 may be formed include, but are not limited to, photo resist, PDMS, or a flexible material selected from the group, which includes both dielectric and non-dielectric materials, consisting of a highly cross-linked uv-curable or thermal-curable polymer, a highly cross-linked uv-curable or thermal-curable plastic, a polysiloxane compound, silicon, silicon dioxide, spin-on glass, a solgel material, silicon nitride, diamond, diamond-like carbon, aluminum oxide, sapphire, zinc oxide, and titanium dioxide.

Cap 36 comprises a plasmonically active structure formed on top of pillar 34 in direct contact with pillar 34. A plasmonically active structure material is a material that converts radiation, such as light or photons, into plasmons, a density wave in an electron gas. In one implementation, cap 36 comprises a metal material that enhances the intensity of electromagnetic radiation emitted as a result of the reaction of the analyte and the light impinging the analyte upon nano fingers 26. In one implementation, cap 36 comprises silver, gold, copper, platinum, aluminum, or combinations of these metals in the form of alloys or multilayer systems. In another implementation, cap 36 may comprise other metallic materials, such as a tungsten oxide (WOx) or titanium oxide (TiOx), that provide such intensity enhancement.

As shown by FIG. 1, the pillars 34 of different nano fingers 26 have different geometries. In the example illustrated, pillars 26A and 26D have a smaller cross-sectional area or smaller diameter as compared to the cross-sectional area or diameters of pillars 26B and 26C. In the example illustrated, the distance between a pillar 26 having a larger cross-sectional diameter and a pillar having a smaller cross-sectional diameter is less than or equal to one half that of the distance between two adjacent pillars 26 having a smaller cross-sectional diameter. In the example illustrated, the diameters of pillars 34 of nano fingers 26A and 26D are such that nano fingers 26A and 26D are likely to bend or collapse upon the application of a stimulus or do not bend or collapse upon the application of a stimulus. As a result, the class or bendable nano fingers 26A and 26D are more likely to bend or collapse towards the adjacent stationary nano fingers 26B and 26C. Nano finger 26A is more likely to collapse or bend towards the stationary nano finger 26B while nano finger 26D is more likely to collapse or bend towards the stationary nano finger 26C.

In one implementation, the different geometries are based upon an applied stimulus of heat. The pillars 34 of nano fingers 26A and 26D are formed from a material or materials that do not bend or collapse or that bend or collapse at a slower rate or at a much higher temperature as compared to the pillars 34 of nano fingers 26B and 26C due to their different geometries despite nano fingers 26B and 26C being formed from the same material as that of pillars 34 of nano fingers 26A, 26D. In one implementation, pillars 34 of nano fingers 26B and 26C have a diameter of at least 10 nm or 10% less than that of the diameter of pillar 34 of nano fingers 26A and 26D. In yet other implementations, the differences in size between such pillars may vary depending upon the material chosen for pillars 34 as well as the stimulus to be applied to actuate bending or collapse of the selected nano fingers 26B and 260.

Figure 2:
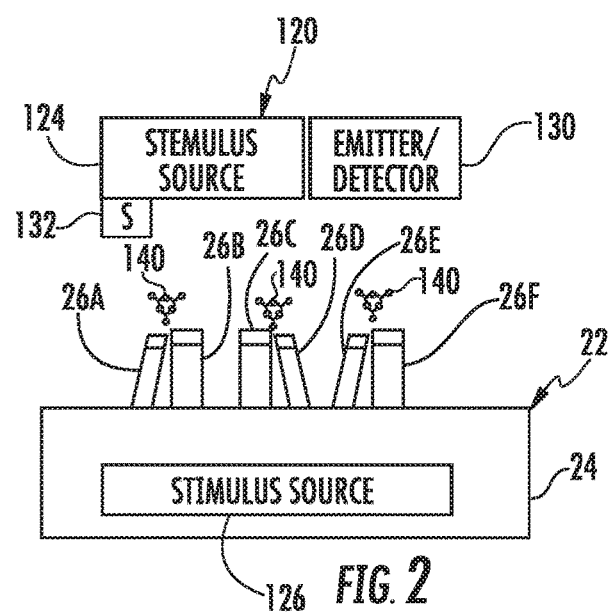
FIG. 2 is a side view of an example SEL sensor comprising the SEL sensor stage of FIG. 1 during application of a stimulus.

FIG. 2 illustrates an example SEL sensor 120. Sensor 120 comprises SEL sensor stage 22, stimulus sources 124, 126 and SEL emitter/detector 130. Stimulus sources 124 and 126 comprise devices that apply stimulus to nano fingers 26 of stage 22 such that selected nano fingers, the thinner nano fingers 26A, 26D and 26E bend or collapse toward adjacent thicker or wider nano fingers 26B, 26C and 26F. In the example illustrated, stimulus source 124 is supported above nano fingers 26 of stage 22 while stimulus source 126 is located below nano fingers 26 of stage 22. In one implementation, stimulus source 126 is embedded or contained within substrate 24 of stage 22.

In one implementation, stimulus sources 120 and 126 provide a stimulus in the form of heat. For example, stimulus sources 124 and 126 may each comprise electrical resistors that generate heat upon the application of electrical current. In one implementation, stimulus source 26 may comprise electric resistors formed upon or embedded within the material of substrate 24. The heat applied by sources 120 and 126 raises a temperature of the materials of pillars 34 of nano fingers 26. Due to the thinner geometry, smaller width, or smaller diameter of the pillars 34 of nano fingers 26A, 26C and 26E relative to the wider geometry, larger width or larger diameter of the pillars 34 of nano fingers 26B, 26D and 26F, the pillar 34 of nano fingers 26B, 26D and 26F take longer to heat up. As a result, the material forming pillars 34 of nano fingers 26A, 26C and 26E reaches or exceeds a glass transition temperature of the material forming pillars 34 so as to collapse or bend before nano fingers 26B, 26D and 26F.

In some implementations, stimulus source 124 (or stimulus source 126) may additionally comprise a sensor 132. Sensor 132 may provide closed-loop feedback to enhance the control and operation of stimulus sources 124 and 126. In one implementation, sensor 132 comprises a temperature sensor which indicates the temperature of: the air about nano fingers 26, stage 22, nano fingers 26 or pillars 34 of nano fingers 26 so as to indicate the expected state of nano fingers 26 such as whether nano fingers 26A, 26D and 26E have attained a bent or collapse state. In one implementation, such signals are utilized by controller associated with stimulus source 124 and stimulus source 126 to control activation and inactivation of such stimulus sources 124, 126 as well as to control the rate at which heat is applied by such stimulus sources 124, 126.

In one implementation, sensor 132 may comprise a camera or other optical sensor which senses the actual bending or collapse of nano fingers 26. Using captured images and photo or optical recognition technology, the bent or collapsed state of nano fingers 26 may be determined. Such information may be utilized by a controller associated with stimulus source 124, 126 to control activation and inactivation of such stimulus sources 124, 126 as well as to control the rate at which heat is applied by such stimulus sources 124, 126. In one implementation, such a controller associated with stimulus source 124, 126 may comprise an application-specific integrated circuit (ASIC) or a processing unit and instructions on associated non-transitory computer-readable medium. In some implementations, sensor 132 may be omitted, wherein the time at which stimulus sources are inactivated and the rate at which stimulus sources 124, 126 apply heat (or another stimulus) is predetermined and predefined. In some implementations, sensor 120 may omit one of stimulus sources 124, 126.

Figure 3:
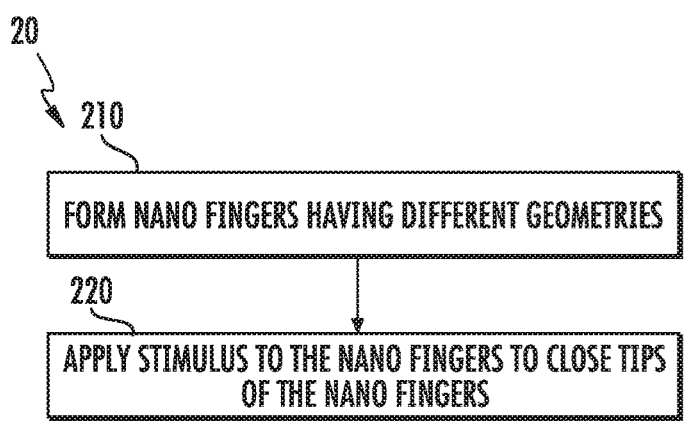
FIG. 3 is a flow diagram of an example method for forming and using an SEL sensing stage.

Emitter/detector 130 comprises an emitter device or multiple emitter devices that emit radiation, such as light which impinges analyte 140 and caps 36 of nano fingers 26. Emitter/detector 130 comprises a detector device or multiple detector devices that sense interaction of the impinging light with the analyte 140 and caps 36. For example, in one implementation, emitter/detector 130 comprises a Raman detector that directs light at stage 22 and that receives and senses light that has been scattered from stage 22. The characteristics of the scattered light sensed by the Raman detector indicate characteristics of analyte 140. In other implementations, emitter/detector 130 may comprise other types of SEL devices that detect interaction of light with analyte 140 and caps 36, FIG. 3 is a flow diagram of an example method 200 for preparing an analyte for analysis using an SEL sensor stage, such as stage 22. Method 200 facilitates enhanced directional control over the bending or collapse of nano fingers of a stage, Although method 200 is described as being carried out as part of SEL sensor 120, it should be appreciated that method 200 may be carried out with any of the SEL sensor stage as described hereafter or with other similar SEL sensor stages.

As indicated by block 210, nano fingers having different geometries are formed. One example of such nano fingers having different geometries is shown in FIGS. 1 and 2, wherein wider or larger diameter nano fingers are separated by a pair of consecutive thinner or smaller diameter nano fingers. In other implementations, larger diameter nano fingers and smaller diameter nano fingers may alternate. In yet other implementations, other patterns or arrangements of larger diameter and smaller diameter nano fingers may be formed. As will be described draft with respect to FIG. 4, in yet other implementations, such nano fingers may be arranged in a cluster, wherein some of the nano fingers have larger diameters and other of the nano fingers have smaller diameters.

As indicated by block 220, a stimulus (or multiple stimuli) is applied to the nano fingers so as to close the tips or caps 36 of the nano fingers. With reference to SEL sensor 120, stimulus sources 124 and 126 apply stimulus to nano fingers 26 of stage 22. In one implementation, stimulus sources 124 and 126 apply heat such that the temperature of the material of pillars 34 of nano fingers 26A, 26D and 26E reach a glass transition temperature of the material, causing such nano fingers to bend or collapse. Due to van der Waals forces and other electrostatic forces, such nano fingers bend or collapse towards the presently unbending or lesser bending adjacent wider nano fingers 26B, 26C and 26F. In one implementation, the application of heat is controlled such that the material of pillars 34 of the wider nano fingers 26 does not reach the glass transition temperature of the material, inhibiting the collapse of the wider nano fingers 26. In one implementation, the application of heat is controlled based upon information received from sensor 132.

The collapse or bending of nano fingers 26A, 26D and 26E closes their caps 36 towards caps 36 of the unbent nano fingers 26B, 26C and 26F, respectively, linking the caps with analyte 140 pinched therebetween. For purposes of this disclosure, the term "link", "linked" or "linking", when referring to the closed relationship between nano fingers or the caps of such nano fingers, encompasses both direct linking, such as direct contact or near contact of two adjacent nano fingers or caps and indirect linking such as when the nano fingers or caps form a consecutive series or chain of directly connected nano fingers or caps, such as where two nano fingers, separated by an intermediate nano finger (or multiple intermediate nano fingers), may be indirectly linked to one another by the intermediate nano finger (or multiple intermediate nano fingers). This may result in analyte 140 being captured and retained between the closed tips or caps 36. In some implementations, the analyte 140 is applied as part of a liquid, wherein the liquid is allowed to evaporate, or evaporates in response to the applied heat, leaving the analyte 140. Such evaporation may further assist in closing caps 36 towards one another through capillary forces. In other implementations, analyte 140 may be applied to nano fingers 26 by exposing nano fingers 26 to a gas rather than a liquid.

Thereafter, once the nano fingers 26 have been exposed to analyte 140 and once stimulus has been applied to nano fingers 26 so as to close or link caps 36, the analyte on stage 22 may be ready for analysis through the use of emitter/detector 130. As described above, emitter/detector 130 may impinge the analyte 140 as well as nano fingers 26 and stage 22 with radiation or light. Emitter/detector 130 further senses interaction of the impinging light with the analyte 140 and nano fingers 26, wherein such sensed interactions indicate characteristics of analyte 140.

Figure 4:
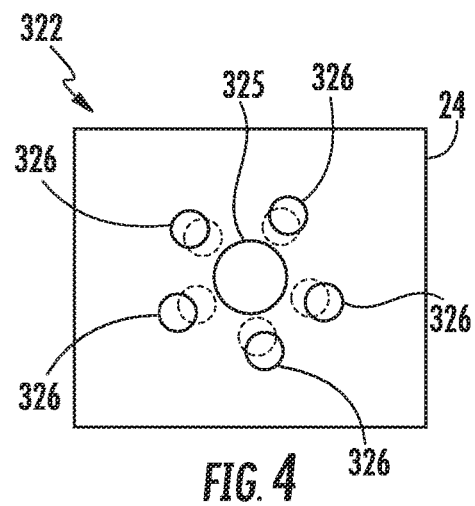
FIG. 4 is a top view of another example SEL sensor stage.

FIG. 4 is a top view of another example SEL sensor stage 322. Stage 322 may be utilized in place of stage 22 described above with respect to method 200 and with respect to detection or sensing of an analyte. Similar to sensor stage 22, stage 322 comprises nano fingers of different geometries to provide enhanced directional control over the bending or collapse of such nano fingers in response to an applied stimulus. As shown by FIG. 4, stage 322 comprises a cluster of at least three nano fingers extending from substrate 24, wherein the nano fingers of the cluster have different geometries so as to bend into a closed state such that each of the nano fingers of the cluster are linked to one another. In the example illustrated, stage 322 comprises a center nano finger 325 and peripheral nano fingers 326.

Center nano finger 325 is similar to nano fingers 26B, 26D and 26F described above. Center nano finger 326 comprises a pillar 34 underlying and supporting a cap 36. Center nano finger 325 has a pillar 34 with a diameter that is greater than the diameter of the pillar 34 of each of peripheral nano fingers 326. Center nano finger 325 is centrally located between peripheral nano fingers 326 which collectively encircle center nano finger 325.

Peripheral nano fingers 326 are each similar to nano fingers 26A, 26C and 26E described above. Peripheral nano fingers 326 each include a pillar 34 underlying and supporting a cap 36. Each peripheral nano finger 326 has a pillar 34 with a diameter that is less than the diameter of the pillar 34 of center nano finger 325. The smaller diameter of the pillar 34 of each of peripheral nano finger 326 facilitates bending and collapse of each peripheral nano finger 326 in response to an applied stimulus while the pillar 34 of center nano finger 325, at the same time, does not bend or collapse, or else bends or collapses to a lesser extent.

As shown by broken lines in FIG. 4, upon the application of a stimulus, such as heat, center nano finger 325 remains substantially upright and unbent in response to an applied stimulus. At the same time, each of the peripheral nano finger 326 have collapsed and have bent to a closed state with respect to center nano finger 325, linking with nano finger 325. In one implementation where the applied stimulus is heat, the pillars 34 of peripheral nano finger 326 heat up faster than the pillar 34 of center nano finger 325, reaching their glass transition temperatures sooner and allowing peripheral nano fingers 326 to collapse while center nano finger 325 remains upstanding. Upon collapse of nano finger 326, the stimulus, heat, being applied may be terminated or slowed such that the material of pillars 34 of center nano finger 325 does not reach its glass transition temperature. The collapse of peripheral nano finger 326 towards center nano finger 325 may be further facilitated by van der Waals forces. In some implementations, the collapse of peripheral nano fingers 326 towards center nano finger 325 may be further facilitated through capillary forces, such as upon evaporation of a liquid containing the analyte being applied to nano fingers 325, 326.

Figures 5, 6, 7:
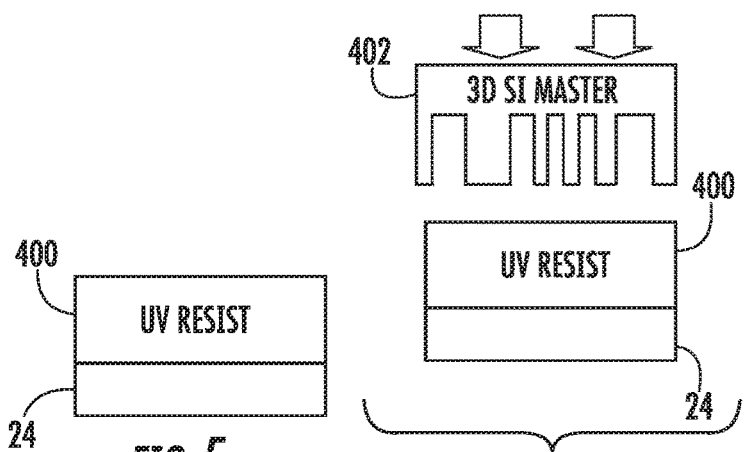
FIGS. 5-7 are diagrams illustrating an example method for forming an example SEL sensor stage.

FIGS. 5-7 and FIG. 1 illustrate an example method for forming an SEL sensor stage, such as SEL sensor stage 22 or SEL sensor stage 322. As illustrated by FIG. 5, a layer of material forming substrate 24 is initially coated with a layer 400 of a second moldable or patternable material, such as a UV resistant material. As illustrated by FIG. 4, the layer 400 of the UV resistant material is imprinted with a master 402 comprising an imprint substrate such as a three dimensional quartz or silicon master. While being imprinted with the master 402, layer 400 is exposed to ultraviolet light to harden or cure the now patterned layer 400. As shown by FIG. 7, master 402 is subsequently destroyed or withdrawn, leaving substrate 24 and pillars 34. As shown by FIG. 1, caps 36 are subsequent deposited upon pillars 34 to form the stage 22. The example method illustrated in FIG. 5-7 may be utilized to form other SEL sensor stages having any of a variety of different patterns or arrangements of nano fingers having different geometries, such as SEL stage 322 and those SEL stages described hereafter.

Figure 8:
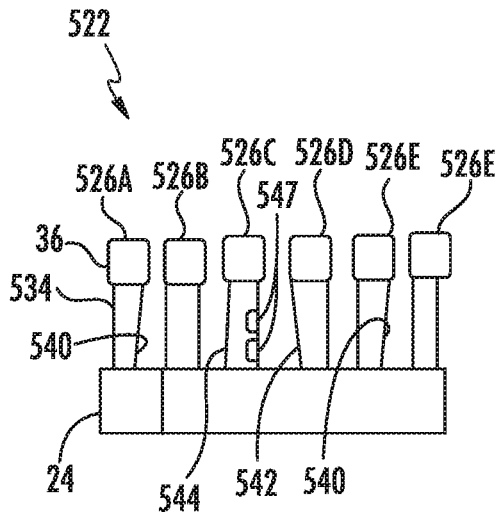
FIG. 8 is a side view of another example SEL sensor stage.

FIG. 8 illustrates another example SEL stage 522. Stage 522 may be utilized in place of stage 22 described above with respect to method 200 and with respect to detection or sensing of an analyte. Stage 522 comprises nano fingers of asymmetric geometries to provide enhanced directional control over the bending or collapse of such nano fingers in response to an applied stimulus. In other words, each individual nano finger has a pillar having an asymmetric cross sectional shape about the axis along which the pillar extends, the asymmetric shape biasing the collapse of the pillar in one direction, due to gravity, in response to an applied stimulus.

In the example illustrated in FIG. 8, stage 522 comprises substrate 24, and nano fingers 526A, 526B, 526C, 526D, 526E and 526F (collectively referred to as nano fingers 526). Nano fingers 526 comprise elongated flexible columnar supports such as needles, fingers, particles or wires. In one implementation, such nano fingers 526 have an aspect ratio of and at least 10:1 (a height of at least 10 times the thickness or diameter). In one implementation, such nano fingers 526 have a thickness or diameter between 50 nm and 100 nm, while, at the same time, having a height of at least 500 nm and, in one implementation, at least 700 nm. In some implementations, the nano fingers 526 are movable and are self-actuating, wherein such columnar structures bend or flex towards one another in response to micro-capillary forces or van der Waals forces so as to self-organize, wherein such bending facilitates close spacing between the structures for greater scattered radiation intensity.

Each of nano fingers 526 comprises a pillar 534 and a cap 36 (described above). Each pillar 534 comprises an elongate column formed from a polymer material. The polymer material facilitates the use of molding, imprinting or other fabrication techniques to form pillars 534. The polymer material further facilitates bending and flexing of pillars 534 and subsequently closing during use. Examples of polymer materials from which each pillar 534 may be formed include, but are not limited to, photo resist, PDMS, or a flexible material selected from the group, which includes both dielectric and non-dielectric materials, consisting of a highly cross-linked uv-curable or thermal-curable polymer, a highly cross-linked uv-curable or thermal-curable plastic, a polysiloxane compound, silicon, silicon dioxide, spin-on glass, a solgel material, silicon nitride, diamond, diamond-like carbon, aluminum oxide, sapphire, zinc oxide, and titanium dioxide.

In the example illustrated, pillars 534 of nano fingers 526B and 526E have symmetrical cross-sectional shapes, such as symmetrical cylindrical columns extending from substrate 24. Pillars 534 of the remaining nano fingers has asymmetrical cross-sectional shapes such that the center of mass of each of such pillars 534 is horizontally offset from a vertical centerline or vertical axis extending through the center of the base of each of pillars 534. The asymmetrical cross sectional geometry relative to an axis extending from the center of the base changes along the axis. The asymmetrical cross-sectional shapes of the pillars 534 resulting sides of the pillars leaning in a predetermined direction towards and adjacent nano finger. Such leaning may be achieved by either undercutting a side such that the pillar 534 is top-heavy in one direction (pillar 534 of nano finger 526A, 526D and 526 E) or by widening the base of the pillar on one side of the pillar (pillar 534 of nano finger 526C).

In the example illustrated, pillars 534 of nano fingers 526A and 526E each have a greater diameter proximate to their respective caps 36 and a smaller diameter proximate to substrate 24, forming an undercut 540 resulting in the side of the pillar close to the pillar 534 on the right (as seen in FIG. 8) leaning towards the pillar on the right. Pillar 534 of nano finger 526D has a greater diameter proximate to its 36 in a smaller diameter proximate to substrate 24, forming an undercut 542 resulting in the side of the pillar close to the pillar 534 on the left (as seen in 8) leaning towards the pillar on the left. Pillar 534 of nano finger 5280 has a greater diameter proximate to substrate 24 and a smaller diameter proximate to cap 36, wherein the left side 544 of pillar 534 of nano fingers 526 leans or slopes to the right towards pillar 534 of nano finger 526D. The asymmetric cross sectional geometries of the pillars 534 of the different nano fingers 526 and the resulting centers of mass that are horizontally offset the center of the base of each of such pillars 534 causes such pillars 534 and nano fingers 526 to preferentially collapse in a predetermined direction upon the application of stimulus.

Although such leaning pillars 534 are illustrated as having a gradually sloping sides to directionally bias the collapse of such pillars, in other implementations, pillars 534 may comprise cutouts or notches in one side of the pillar that directionally bias the collapse of such nano finger pillars in response to applied stimulus. Examples such cutouts or notches 547 are shown in broken lines with respect to pillar 534 of nano finger 5260, wherein such notches 547 may further directionally bias the bending or collapse of nano finger 5260 to the right towards nano finger 526D.

Figure 9:
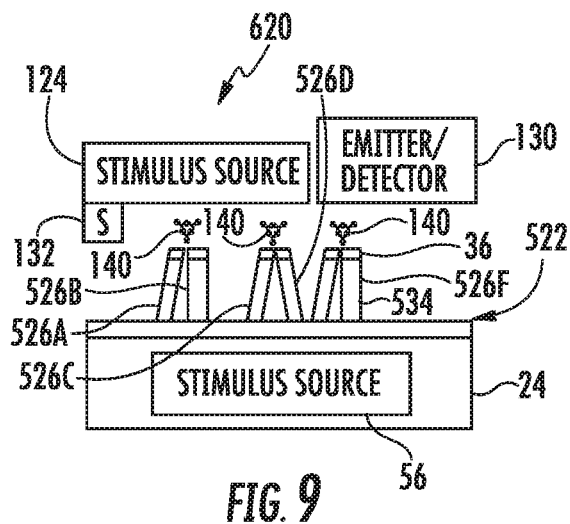
FIG. 9 is a side view of an example SEL sensor comprising the SEL sensor stage of FIG. 8 during application of a stimulus.

FIG. 9 illustrates an example SEL sensor 620. Sensor 620 is similar to sensor 120 described above except that sensor 620 comprises SEL sensor stage 522 in place of stage 22. Those components of sensor 620 which correspond to components of sensor 120 are numbered similarly.

Figure 10:
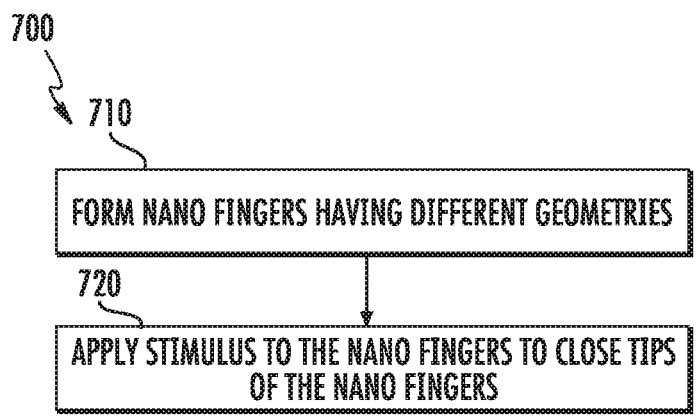
FIG. 10 is a flow diagram of an example method for forming and using an SEL sensing stage.

FIG. 10 is a flow diagram of an example method 700 for preparing an analyte for analysis using an SEL sensor stage, such as stage 522. Method 700 facilitates enhanced directional control over the bending or collapse of nano fingers of a stage. Although method 700 is described as being carried out as part of SEL sensor 620, it should be appreciated that method 700 may be carried out with any of the SEL sensor stage as described hereafter or with other similar SEL sensor stages.

As indicated by block 710, nano fingers having pillars with asymmetric cross sectional geometries are formed. One example of such nano fingers having asymmetric cross sectional geometries is shown in FIG. 8. Although stage 522 is illustrated as having a particular arrangement of directionally biased nano fingers, wherein nano finger 526A leans towards nano finger 526B, wherein nano fingers 5260 and 526D each lean towards one another and wherein nano finger 526E leans towards nano finger 526E, in other implementations, other arrangements of leaning nano fingers may be provided. For example, stage 522 may be similar to stage 322 described above, wherein the pillars of each of the peripheral nano fingers 326 has an asymmetric cross sectional geometry, similar to that described above with respect to nano fingers 526, so as to lean towards a center nano finger 325, wherein the leaning of the pillars of the peripheral nano fingers 526 biases such pillars to collapse towards the center nano finger 325 of the cluster in response to an applied stimulus, such as heat.

As indicated by block 720, a stimulus (or multiple stimuli) is applied to the nano fingers so as to close the tips or caps 36 of the nano fingers, With reference to SEL sensor 620, stimulus sources 124 and 126 apply stimulus to nano fingers 526 of stage 522. In one implementation, stimulus sources 124 and 126 apply heat such that the temperature of the material of pillars 534 of nano fingers 526 reach a glass transition temperature of the material, causing such nano fingers to bend or collapse, Due to the leaning of such nano fingers 526 prior to the application of stimulus and the horizontally offset centers of mass of the pillars 534 of the selected nano fingers 526, the direction which the nano fingers collapse after the application of stimulus, controlled as shown in FIG. 9. In one implementation, the application of heat is controlled based upon information received from sensor 132. In the example illustrated, nano finger 526A closes or collapses towards nano finger 526B, nano fingers 5260 and 526D close or collapse towards one another and nano finger 526E closes or collapses towards nano finger 526E upon being heated.

The collapse or bending of nano fingers 526 may result in analyte 140 being captured and retained between the closed tips or caps 36. In some implementations, the analyte 140 is applied as part of a liquid, wherein the liquid is allowed to evaporate, or evaporates in response to the applied heat, leaving the analyte 140. Such evaporation may further assist in closing caps 36 towards one another through capillary forces. In other implementations, analyte 140 may be applied to nano fingers 526 by exposing nano fingers 26 to a gas rather than a liquid.

Thereafter, once the nano fingers 526 have been exposed to analyte 140 and once stimulus has been applied to nano fingers 526 so as to close or link caps 36, the analyte on stage 522 may be ready for analysis through the use of emitter/detector 130. As described above, emitter/detector 130 may impinge the analyte 140 as well as nano fingers 526 and stage 522 with radiation or light. Emitter/detector 130 further senses interaction of the impinging light with the analyte 140 and nano fingers 526, wherein such sensed interactions indicate characteristics of analyte 140.

Figure 11:
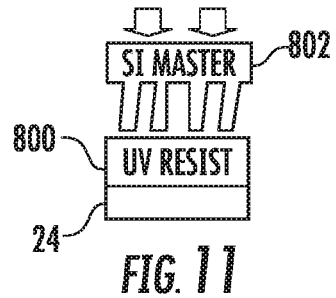
FIGS. 11 and 12 are diagrams illustrating an example method for forming an example SEL sensor stage.
Figure 12:
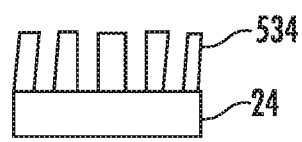

FIGS. 11 and 12 and FIG. 8 illustrate an example method for forming an SEL sensor stage, such as SEL sensor stage 522 or SEL sensor stage 322. As illustrated by FIG. 11, a layer 800 of the UV resistant material supported by substrate 24 is imprinted with a master 802, such as a silicon master. While being imprinted with the master, layer 800 is exposed to ultraviolet light to harden or cure the now patterned layer 800. As shown by FIG. 12, master 802 is subsequently destroyed or withdrawn, leaving substrate 24 and pillars 534. As shown by FIG. 8, caps 36 are subsequent deposited upon pillars 34 to form the stage 522. The example method illustrated in FIG. 11-12 in FIG. 8 may be utilized to form other SEL sensor stages having any of a variety of different patterns or arrangements of nano fingers having different asymmetric cross sectional geometries, such as SEL stage 322 and those SEL stages described hereafter.

Figure 13:
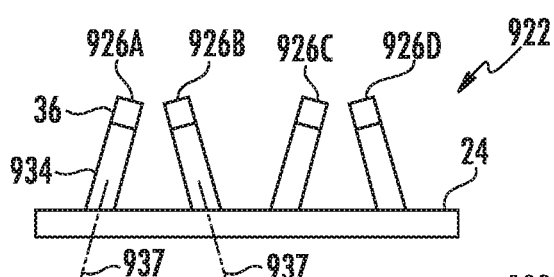
FIG. 13 is a side view of another example SEL sensor stage.

FIG. 13 illustrates another example SEL sensor stage 922. Stage 922 may be utilized in place of stage 522 or stage 22 as part of sensor 120. Stage 922 comprises substrate 24, and nano fingers 926A, 926B, 9260, and 926D (collectively referred to as nano fingers 926). Nano fingers 926 comprise elongated flexible columnar supports such as needles, fingers, particles or wires. In one implementation, such nano fingers 926 have an aspect ratio of and at least 10:1 (a height of at least 10 times the thickness or diameter). In one implementation, such nano fingers 926 have a thickness or diameter between 50 nm and 100 nm, while, at the same time, having a height of at least 500 nm and, in one implementation, at least 700 nm. In some implementations, the nano fingers 926 are movable and are self-actuating, wherein such columnar structures bend or flex towards one another in response to micro-capillary forces or van der Waals forces so as to self-organize, wherein such bending facilitates close spacing between the structures for greater scattered radiation intensity.

Each of nano fingers 926 comprises a pillar 934 and a cap 36 (described above). Each pillar 534 comprises an elongate column formed from a polymer material. The polymer material facilitates the use of molding, imprinting or other fabrication techniques to form pillars 534. The polymer material further facilitates bending and flexing of pillars 934 and subsequently closing during use. Examples of polymer materials from which each pillar 934 may be formed include, but are not limited to, photo resist, PDMS, or a flexible material selected from the group, which includes both dielectric and non-dielectric materials, consisting of a highly cross-linked uv-curable or thermal-curable polymer, a highly cross-linked uv-curable or thermal-curable plastic, a polysiloxane compound, silicon, silicon dioxide, spin-on glass, a solgel material, silicon nitride, diamond, diamond-like carbon, aluminum oxide, sapphire, zinc oxide, and titanium dioxide.

In the example illustrated, pillars 934 of nano fingers 926 have substantially symmetrical cross-sectional shapes, but lean in a predetermined direction prior to the application of the stimulus. Pillars 934 of nano fingers 926A and 926B lean towards one another while pillars 934 of nano fingers 926C and 926D lean towards one another. Each of pillars 934 of nano fingers 926 has a first side on a first side of a central axis 937 that forms an angle of at least 90° or greater than 90° with substrate 24 and a second side on a second side of the central axis 937 forming an angle of less than or equal to 90° with the substrate. Upon subsequent application of a stimulus, such as heat, two-stage 922, such as described above with respect to blocks 220 and 720 in method 200 and 700, respectively, nano fingers 926 collapse or bend into closer proximity, capturing analyte 140 (shown in FIG. 9).

Figure 14:
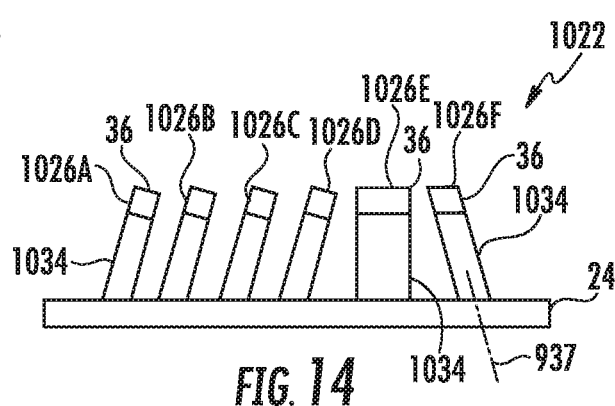
FIG. 14 is a side view of another example of an SEL sensor stage.

FIG. 14 illustrates another example SEL sensor stage 1022. Stage 1022 may be utilized in place of stage 522 or stage 22 as part of sensor 120. Stage 1022 comprises substrate 24, and nano fingers 1026A, 1026B, 1026C, 1026D, 1026E, 1026F (collectively referred to as nano fingers 926). Nano fingers 1026 comprise elongated flexible columnar supports such as needles, fingers, particles or wires. In one implementation, such nano fingers 926 have an aspect ratio of and at least 10:1 (a height of at least 10 times the thickness or diameter). In one implementation, such nano fingers 926 have a thickness or diameter between 50 nm and 100 nm, while, at the same time, having a height of at least 500 nm and, in one implementation, at least 700 nm. In some implementations, the nano fingers 926 are movable and are self-actuating, wherein such columnar structures bend or flex towards one another in response to micro-capillary forces or van der Waals forces so as to self-organize, wherein such bending facilitates close spacing between the structures for greater scattered radiation intensity.

Each of nano fingers 1026 comprises a pillar 1034 and a cap 36 (described above), Each pillar 1034 comprises an elongate column formed from a polymer material. The polymer material facilitates the use of molding, imprinting or other fabrication techniques to form pillars 1034. The polymer material further facilitates bending and flexing of pillars 1034 and subsequently closing during use. Examples of polymer materials from which each pillar 1034 may be formed include, but are not limited to, photo resist, PDMS, or a flexible material selected from the group, which includes both dielectric and non-dielectric materials, consisting of a highly cross-linked uv-curable or thermal-curable polymer, a highly cross-linked uv-curable or thermal-curable plastic, a polysiloxane compound, silicon, silicon dioxide, spin-on glass, a solgel material, silicon nitride, diamond, diamond-like carbon, aluminum oxide, sapphire, zinc oxide, and titanium dioxide.

In the example illustrated, nano fingers 1026A, 1026B, 10260 and 1026D are each similar to nano fingers 926A described above, with each of such nano fingers leaning in a same direction (to the right in FIG. 14). Nano finger 1026E is an upstanding nano finger having a symmetrical cross-section, similar to nano finger 526B described above. Nano finger 1026F leans toward nano fingers 1026E combining features from nano finger 926D and nano finger 526D described above. Like nano finger 926D, nano finger 1026F extends along an axis 937 that is oblique to substrate 24. Like nano finger 526D, nano finger 1026F has an asymmetric cross sectional shape along axis 937.

The oblique angle of 1026F as well as the asymmetrical cross-sectional geometry of nano finger 1026F bias the direction in which nano finger 1026F classes upon the application of a stimulus, such as heat. In the example illustrated, upon the application of a stimulus, such as heat, each of nano fingers 1026A-1026D collapse to the right, leaning upon one another with nano finger 1026D leaning against nano finger 1026E. Nano finger 1026F classes in leans against nano finger 1026E on an opposite side of nano finger 1026E as nano finger 1026D.

Figure 15:
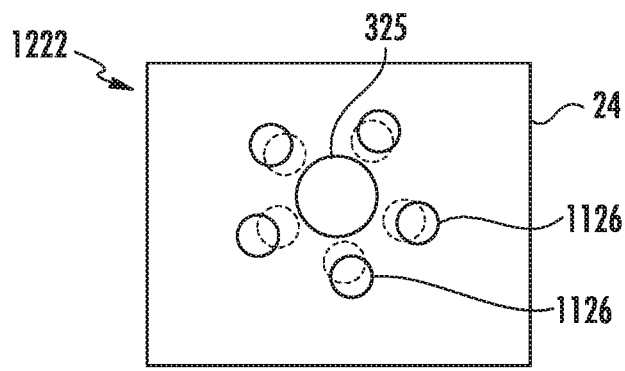
FIG. 15 is a top view of another example SEL sensor stage.

FIG. 15 is a top view of another example SEL sensor stage 1122. Stage 11 22 may be utilized in place of stage 22 or 522 in sensor 120 described above. Stage 1122 is similar to stage 322 described above except that stage 1122 comprises peripheral nano fingers 1126 in lieu of peripheral nano fingers 326. Peripheral nano fingers 1126 are each similar to nano fingers 1026A, wherein each of such peripheral nano fingers 1126 are preformed so as to lean towards central nano finger 325. Each of such peripheral nano fingers 1126 form an angle of less than 90° on a side proximate to central nano finger 325 and form an angle of greater than 90° on a side opposite to central nano finger 325. As shown by broken lines, in response to the application of a stimulus, such as heat, the tips of each of the peripheral nano fingers 1126 bend or collapse in the direction in which they lean and into a closed state or linked state with respect to central nano finger 325.

Figure 16:
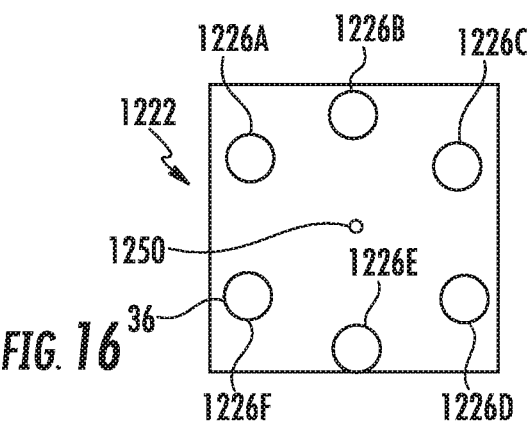
FIG. 16 is a top view of another example SEL sensor stage prior to the application of a stimulus.
Figure 17:
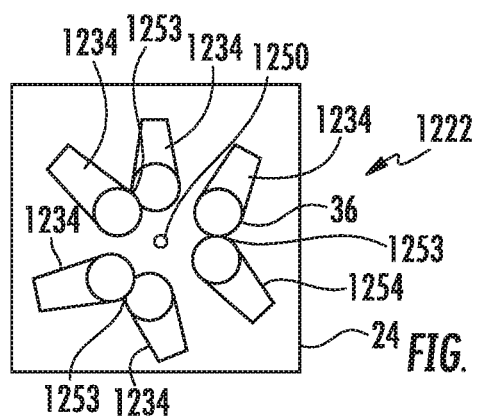
FIG. 17 is a top view of the example SEL sensor stage of FIG. 16 during or after the application of a stimulus.

FIGS. 16 and 17 are top views of another example SEL sensor stage 1222 before and after application of a stimulus, such as heat, respectively. Stage 1222 may be utilized in place of stage 22 or 522 in sensor 120 described above. Stage 1222 comprises substrate 24 (described above) and nano fingers 1226A, 1226B, 12260, 1226D, 1226E and 1226F (collectively referred to as nano fingers 1226). Nano fingers 1226 are arranged in a cluster about a center point 1250. Each of nano fingers 1226 has a pillar 1234 and a cap 36 (described above).

Each of pillars 1234 has a preformed lean towards centerpoint 1250 and towards and adjacent nano finger. In one implementation, the preformed lean of each of pillars 1234 may be achieved by providing each of pillars 12 34 with an asymmetric cross sectional shape as described above with respect to selected pillars 534 of stage 522. In another implementation, the preformed lean of each of pillars 1234 may be achieved by providing each of pillars 1234 with an oblique angle as described above with respect to nano fingers 926 of stage 922. In some implementations, the preformed lean of each of pillars 1234 may be similar to that the preformed lean of pillar 1034 of nano finger 1026F of stage 1022. As shown by FIG. 17, upon the application of the stimulus, and after exposure to such as heat, nano fingers 1226 bend or collapse into a closed or linked state in which nano fingers 1226A and 1226B are linked, in which nano fingers 1226C and 1226D are linked, and in which nano fingers 1226E and 1226F are linked, providing three dimers (three pairs of linked nano fingers) and providing three "hot spots" 1253.

Figure 18:
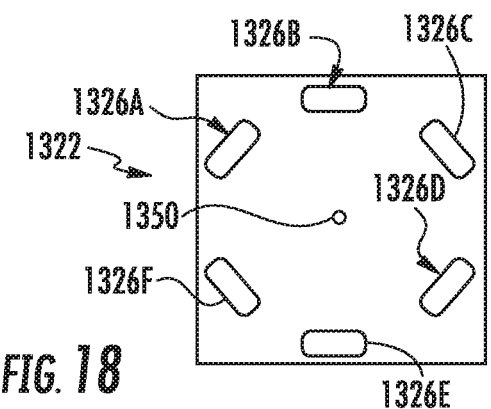
FIG. 18 is a top view of another example SEL sensor stage prior to the application of a stimulus.
Figure 19:
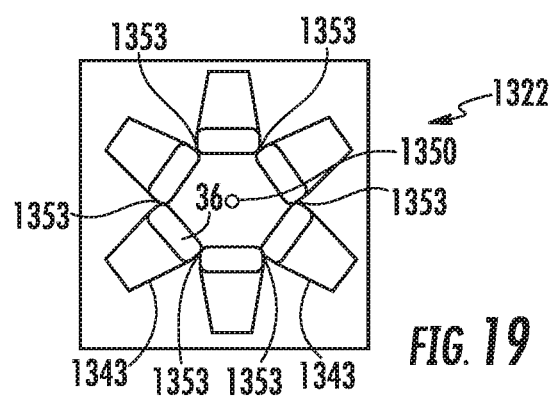
FIG. 19 is a top view of the example SEL sensor stage of FIG. 18 during or after the application of a stimulus.

FIGS. 18 and 19 are top views of another example SEL sensor stage 1322 before and after application of a stimulus, such as heat, respectively. Stage 1322 may be utilized in place of stage 22 or 522 in sensor 120 described above. Stage 1322 comprises substrate 24 (described above) and nano fingers 1326A, 1326B, 13260, 1326D, 1326E and 1326F (collectively referred to as nano fingers 1326), Nano fingers 1326 are arranged in a cluster about a center point 1350. Each of nano fingers 1326 has an elongated rectangular or oval pillar 1334 and a cap 36 (described above).

Each of pillars 1334 has a preformed lean towards centerpoint 1350 and towards and adjacent nano finger. In one implementation, the preformed lean of each of pillars 1334 may be achieved by providing each of pillars 1334 with an asymmetric cross sectional shape as described above with respect to selected pillars 534 of stage 522. In another implementation, the preformed lean of each of pillars 1334 may be achieved by providing each of pillars 1334 with an oblique angle as described above with respect to nano fingers 926 of stage 922. In some implementations, the preformed lean of each of pillars 1334 may be similar to that the preformed lean of pillar 1034 of nano finger 1026F of stage 1022, As shown by FIG. 19, upon the application of the stimulus, and after exposure to such as heat, nano fingers 1326 bend or collapse into a closed or linked state in which all of the nano fingers 1326 are linked, providing "hot spots", sharp, defined points where adjacent caps 36 are linked or otherwise closely contact one another.

Figure 20:
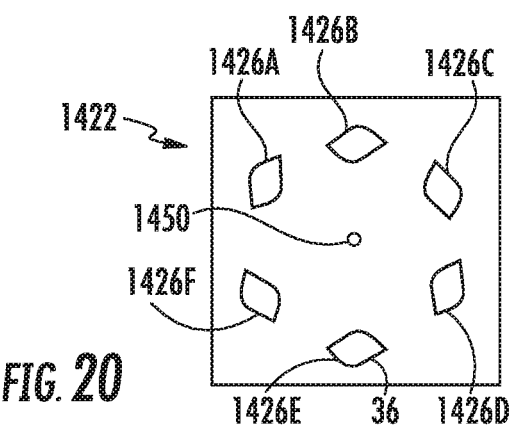
FIG. 20 is a top view of another example SEL sensor stage prior to the application of a stimulus.
Figure 21:
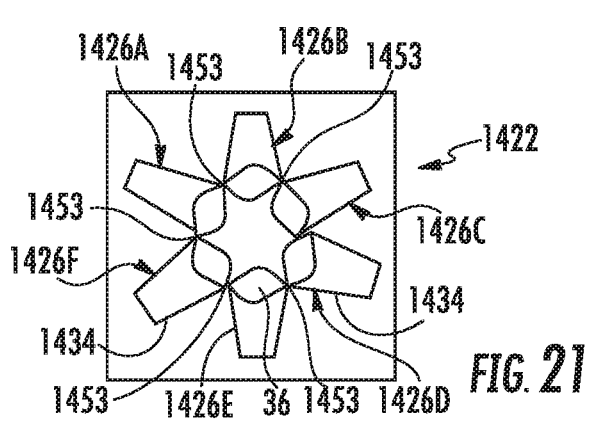
FIG. 21 is a top view of the example SEL sensor stage of FIG. 20 during or after the application of a stimulus.

FIGS. 20 and 21 are top views of another example SEL sensor stage 1422 before and after application of a stimulus, such as heat, respectively. Stage 1422 may be utilized in place of stage 22 or 522 in sensor 120 described above. Stage 1322 comprises substrate 24 (described above) and nano fingers 1426A, 1426B, 14260, 1426D, 1426E and 1426F (collectively referred to as nano fingers 1426). Nano fingers 1426 are arranged in a cluster about a center point 1450. Each of nano fingers 1426 has an elongated lemon-shaped pillar 1434 and a cap 36 (described above).

Each of pillars 1434 has a preformed lean towards centerpoint 1450 and towards and adjacent nano finger. In one implementation, the preformed lean of each of pillars 1434 may be achieved by providing each of pillars 1434 with an asymmetric cross sectional shape as described above with respect to selected pillars 534 of stage 522. In another implementation, the preformed lean of each of pillars 1434 may be achieved by providing each of pillars 1434 with an oblique angle as described above with respect to nano fingers 926 of stage 922. In some implementations, the preformed lean of each of pillars 1434 may be similar to that the preformed lean of pillar 1034 of nano finger 1026F of stage 1022. As shown by FIG. 21, upon the application of the stimulus, and after exposure to such as heat, nano fingers 1426 bend or collapse into a closed or linked state in which all of the nano fingers 1426 are linked, providing a high density region of hot spots 1453. Due to the lemon-shape of each of caps 36 and pillars 1434, hot spots 1453 are provided by a sharp or acute point of contact between consecutive nano fingers 1426.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A surface enhanced luminescence (SEL) sensor comprising:
   a substrate;
   a cluster of at least three nano fingers extending from the substrate, the nano fingers of the cluster having different geometries, wherein the nano fingers have support pillars, wherein the support pillars are non-segmented from a base of the nano fingers to a top of the nano fingers, wherein a first nano finger has a size and shape different from a second nano finger so as to bend into a closed state such that each of the nano fingers of the cluster are linked to one another.

2. The sensor of claim 1, wherein each one of the at least three nano fingers of the cluster extends along an axis, the nano finger having an asymmetric cross sectional shape relative to the axis, wherein the shape changes along the axis.

3. The sensor of claim 2, wherein the nano finger comprises a first side on a first side of the axis forming an angle greater than 90° with the substrate and a second side on a second side of the axis forming an angle of less than or equal to 90° with the substrate.

4. The sensor of claim 2, wherein the nano finger comprises a first side on a first side of the axis forming an angle less than 90° with the substrate and a second side on a second side of the axis forming an angle of at least 90° with the substrate.

5. The sensor of claim 2, wherein the axis extends perpendicular to the substrate.

6. The sensor of claim 2, wherein the axis extends obliquely with respect to the substrate.

7. The sensor of claim 1, wherein the at least three nano fingers of the cluster comprise:
   the first nano finger having a first width;
   the second nano finger having a second width and spaced from the first nano finger by a first distance; and
   a third nano finger having a third width, greater than the first width and greater than the second width, wherein the third nano finger is spaced from each of the first nano finger and the second nano finger by a second distance of no greater than one-half the first distance.

8. A surface enhanced luminescence (SEL) sensor comprising:
   a substrate;
   a first nano finger having a center of mass and a base extending from the substrate, the center of mass being offset from a center of the base;
   a second nano finger having a size and shape different from the first nano finger, wherein each one of the first nano finger and the second nano finger is elongated and non-segmented; and
   a non-spherical cap on the nano finger, wherein a width of the non-spherical cap is greater than a width of the nano finger to bend the nano finger in a closed state.

9. The sensor of claim 8, wherein each nano finger has an asymmetric cross sectional geometry that changes along a vertical height of the nano finger.

10. The sensor of claim 9, wherein each nano finger comprises a first side on a first side of an axis the nano finger forming an angle greater than 90° with the substrate and a second side on a second side of the axis forming an angle of less than or equal to 90° with the substrate.

11. The sensor of claim 9, wherein each nano finger comprises a first side on a first side of an axis of the nano finger forming an angle less than 90° with the substrate and a second side on a second side of the axis forming an angle of at least 90° with the substrate.

12. The sensor of claim 9, wherein an axis of the nano finger extends obliquely with respect to the substrate.

13. A surface enhanced luminescence (SEL) sensor comprising:
   a substrate; and
   a cluster of nano fingers, wherein a first nano finger has a size and shape different from a second nano finger, wherein the cluster is centered about a center point and wherein each of the nano fingers of the cluster have non-circular and non-segmented cross-sectional shapes so as to bend towards the center point in response to a stimulus.

14. The sensor of claim 13, wherein each of the nano fingers of the cluster has a pair of pointed sides.

15. A surface enhanced luminescence (SEL) sensor comprising:
   a substrate;
   a cluster of at least three nano fingers extending from the substrate, the nano fingers of the cluster having different geometries, wherein each nano finger has an asymmetric cross-sectional geometry, wherein the cross sectional area of the nano finger increases along a vertical height from a base of the nanofinger to a top of the nano finger so as to bend into a closed state such that each of the nano fingers of the cluster are linked to one another.

16. A surface enhanced luminescence (SEL) sensor comprising:
   a substrate;
   a cluster of at least three nano fingers extending from the substrate, the nano fingers of the cluster having different geometries, wherein each one of the nano fingers is elongated and non-segmented, wherein a first nano finger has a size and shape different from a second nano finger and a third nano finger, wherein the second finger is sized and shaped to remain stationary, and wherein the first nano finger and the third nano finger are sized and shaped to bend into a closed state toward the stationary second nano finger such that each of the nano fingers of the cluster are linked to one another.

17. The surface enhanced luminescence (SEL) sensor of claim 16 wherein a width of the second nano finger is greater than a width of the first nano finger and the third nano finger.

18. The surface enhanced luminescence (SEL) sensor of claim 16 further comprising a fourth nano finger, wherein the fourth nano finger is sized and shaped to bend into a closed state toward the stationary second nano finger such that each of the nano fingers of the cluster are linked to one another.

19. The surface enhanced luminescence (SEL) sensor of claim 16 further comprising a fifth nano finger, wherein the fifth nano finger includes a cap, wherein a width of the cap is the same as a width of the fifth nano finger, wherein a width of the fifth nano finger is sized to bend the cap toward the stationary second nano finger.

* * * * *